United States Patent
Berger et al.

(10) Patent No.: US 7,211,026 B2
(45) Date of Patent: May 1, 2007

(54) DRIVE TRAIN AND METHOD FOR CONTROLLING AND/OR REGULATING A DRIVE TRAIN

(75) Inventors: Reinhard Berger, Buhl (DE); Robert Fischer, Graz (AT); Wolfgang Reik, Buhl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 243 days.

(21) Appl. No.: 10/906,637

(22) Filed: Feb. 28, 2005

(65) Prior Publication Data

US 2005/0209047 A1  Sep. 22, 2005

Related U.S. Application Data

(63) Continuation of application No. PCT/DE2003/002910, filed on Sep. 3, 2003.

(30) Foreign Application Priority Data

Sep. 4, 2002  (DE) ................... 10240841

(51) Int. Cl.
*B60W 10/04* (2006.01)

(52) U.S. Cl. ........................................ 477/92

(58) Field of Classification Search ................ 477/906, 477/92, 73, 78, 107
See application file for complete search history.

(56) References Cited

U.S. PATENT DOCUMENTS

| 5,649,880 A | * | 7/1997 | Tsutsui et al. | ............... 477/125 |
| 6,220,223 B1 | | 4/2001 | Weisman, II et al. | ....... 123/436 |
| 6,675,079 B2 | * | 1/2004 | Kwon | .......................... 701/34 |

FOREIGN PATENT DOCUMENTS

| EP | 314409 | 5/1989 |
| EP | 989013 | 3/2000 |
| EP | 1134460 | 9/2001 |

* cited by examiner

*Primary Examiner*—Dirk Wright
(74) *Attorney, Agent, or Firm*—Simpson & Simpson, PLLC

(57) ABSTRACT

The invention relates to a method for controlling and/or regulating a drive train in a vehicle with an engine and a gearbox, especially an automatic gearbox, whereby depending on a warning signal and a stopping request of the driver an engine stalling aid is launched. The invention also relates to a drive train for a vehicle with an engine and a gearbox, especially an automatic gearbox, especially for carrying out said method.

17 Claims, 2 Drawing Sheets

DRIVE TRAIN AND METHOD FOR CONTROLLING AND/OR REGULATING A DRIVE TRAIN

CROSS-REFERENCE TO RELATED APPLICATIONS

This application is filed under 35 U.S.C. §120 and §365(c) as a continuation of International Patent Application PCT/DE2003/002910, filed Sep. 3, 2003, which application is incorporated herein by reference. This application also claims priority of German Patent Application 102 40 841.6, filed Sep. 4, 2002, which application is incorporated herein by reference.

BACKGROUND OF THE INVENTION

The present invention relates to a method for the control and/or adjustment of a drive train of a vehicle having an engine and a transmission, especially an automatic transmission in which the transmission is controlled via a transmission controller and the engine is controlled via an engine controller. Moreover, the invention relates to a drive train for a vehicle having an engine and a transmission, especially an automatic transmission, a transmission controller being provided for the control of the transmission and an engine controller for the control of the engine.

In a drive train of a vehicle, especially having an automated transmission system, such as an automated shift transmission (ASG), an uninterrupted shift transmission (USG) or a twin clutch transmission (DKG), dry clutches and electromotive actuators may preferably be used. A significant advantage of a system of this type is that when there is a fault, such as a power failure at the transmission control device, the self-inhibiting clutch actuators ensure a retention of the current clutch state. Thus, the drive train transmits exactly the torque to the wheels that is required at the moment of the failure.

However, if the driver intends to stop with the drive train engaged when there is a failure of the transmission actuator, he must stall the engine using the brake.

In particular with high-performance engines, this may cause problems.

BRIEF SUMMARY OF THE INVENTION

The present invention is a method for the control and/or adjustment of a drive train of a vehicle and a drive train of the type mentioned at the outset in which in certain emergency situations a stalling of the engine is assisted in order to prevent safety-critical situations.

This may be achieved via a method for controlling and/or adjusting a drive train of a vehicle having an engine and a transmission, especially an automatic transmission where the transmission is controlled via a transmission controller and the engine is controlled via an engine controller, in which a stall assistance is activated as a function of an emergency signal and a desire to stop on the part of the driver. Therefore, a stall assistance, which preferably ensures a stalling of the engine in the event of a disabling transmission failure, is provided by the present invention. In this way, safety-critical situations for a vehicle may be avoided, and the driver can be prepared for an altered driving performance, such as in the event of a transmission failure, and avoid specialized driving maneuvers, such as passing.

DETAILED DESCRIPTION OF THE INVENTION

Figure 1:
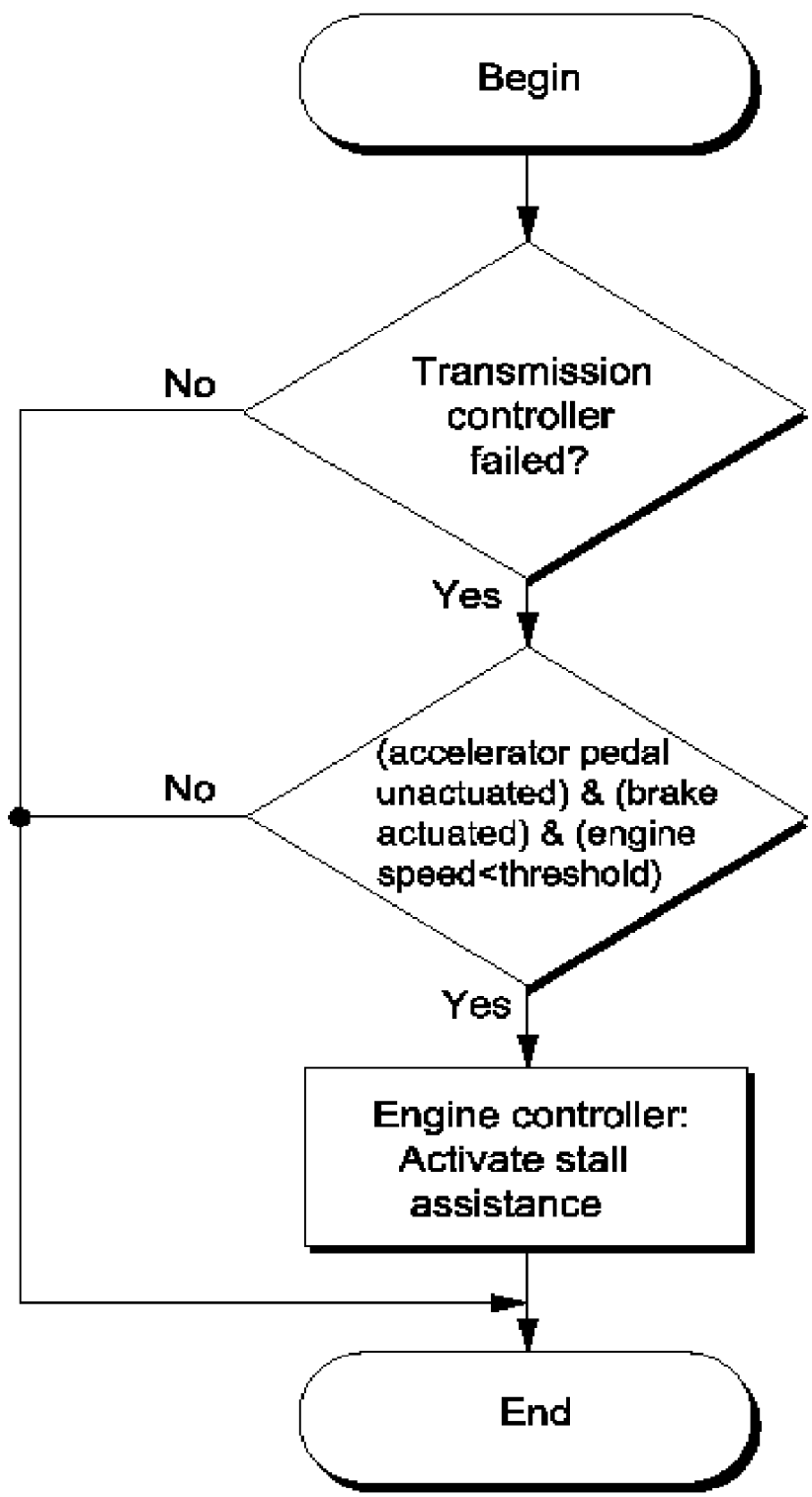
FIG. 1 shows a flow diagram of a possible embodiment of a method according to the invention.

It is especially advantageous if, according to the method of the invention, a check is made at the beginning of whether the transmission controller has failed. Thereafter, if the transmission controller has in fact failed, a check may be made of whether there is a desire to stop on the part of the driver. If there is a desire to stop on the part of the driver, the engine controller can activate the stall assistance. Consequently, the internal combustion engine can be actively switched off by the engine controller if there is an obvious desire on the part of the driver to stop in the event of a failure of the clutch and/or transmission actuation.

In order to detect a failure of the clutch and/or transmission actuation, at least one emergency signal or the like may be sent to the engine controller. The desire to stop on the part of the driver may be detected, for example, if the accelerator pedal is not actuated and at least one brake is actuated. It is also possible that the desire to stop is detected by the engine speed being observed. If, for example, the engine speed falls below a threshold value as a consequence of the drive train no longer separating, a desire to stop on the part of the driver may be detected. According to an advantageous further development of the invention, the idle speed, for example, or a similar parameter may be used as the threshold value.

Within the context of an embodiment of the invention, in the event of a possible failure of the transmission controller, a check is made of whether the transmission control device is operational. When the transmission controller is switched on, it is then possible to check whether the vehicle is in limp-home mode, i.e., in a mode that permits minimal power transfer to the wheels relative to proper transmission operation. If in limp-home mode, a driver warning or the like is issued. This is because it is desirable that a driver should first be warned if the transmission is no longer being operated normally, but instead is in limp-home mode or has even failed totally. As a reaction to this, the driver may then attempt to stop the vehicle at a suitable location and, for example, arrange towing.

The driver warning may be based, on the one hand, on the transmission controller, to the extent that it still works, sending a corresponding signal to the driver information device, such as a display of the controller or the like. It is also possible that any other controller, such as the engine controller, the ABS system, the display or the like detects the failure of the transmission controller and transmits a corresponding signal to the driver information device.

The stalling assistance may be enabled in a method according to the invention, e.g. via a plurality of realization possibilities in the engine controller. According to a further development, an immediate shutdown of the fuel supply and/or the ignition may be provided. It is also conceivable, that the idle controller is switched off. This means a minimum fuel feed when the throttle valve is closed. Another further development of the present invention may provide that the throttle angle or also the fuel supply is limited in order to limit the idle controller thereby.

The proposed realization possibilities may be combined with each other in whatever way and also be supplemented with other realization possibilities.

The stalling assistance may preferably be used with electronic clutch management, an automated-shift transmission (ASG), an uninterrupted-shift transmission (USG), a twin-clutch transmission (DKG) or similar transmission system.

Furthermore, the object of the invention may be achieved via a drive train for a vehicle having an engine and a transmission, especially an automated shift transmission, a transmission controller being provided to control the transmission and an engine controller being provided to control the engine, especially for carrying out the proposed method in which a stalling assistance may be activated as a function of an emergency signal and a driver's desire.

In a drive train according to the invention, it is possible within the context of an embodiment of the invention to provide that, within the context of the stalling assistance, the engine is preferably shut down by the engine controller when there is a failure of the transmission controller and when there is a desire to stop on the part of the driver.

In FIG. 1, within a flow diagram, an exemplary embodiment of the method according to the invention for controlling and/or adjusting a drive train of a vehicle having an engine and an automatic transmission is depicted using a flow chart. In the method, the transmission is controlled via a transmission controller and the engine via an engine controller.

According to the invention, a stall assistance is activated as a function of an emergency signal and a desire to stop on the part of the driver. At the beginning a check is made of whether the transmission controller has failed. If the transmission controller has failed, a check is made of whether there is a desire to stop on the part of the driver. A desire to stop on the part of the driver is detected by the engine controller if the accelerator pedal is not being actuated and/or the brake is actuated and/or the engine speed drops below a threshold value. When there is a desire on the part of the driver, the stall assistance is activated by the engine controller.

In the event of a failure of the clutch and/or transmission actuation, an emergency signal is transmitted to the engine controller.

Figure 2:
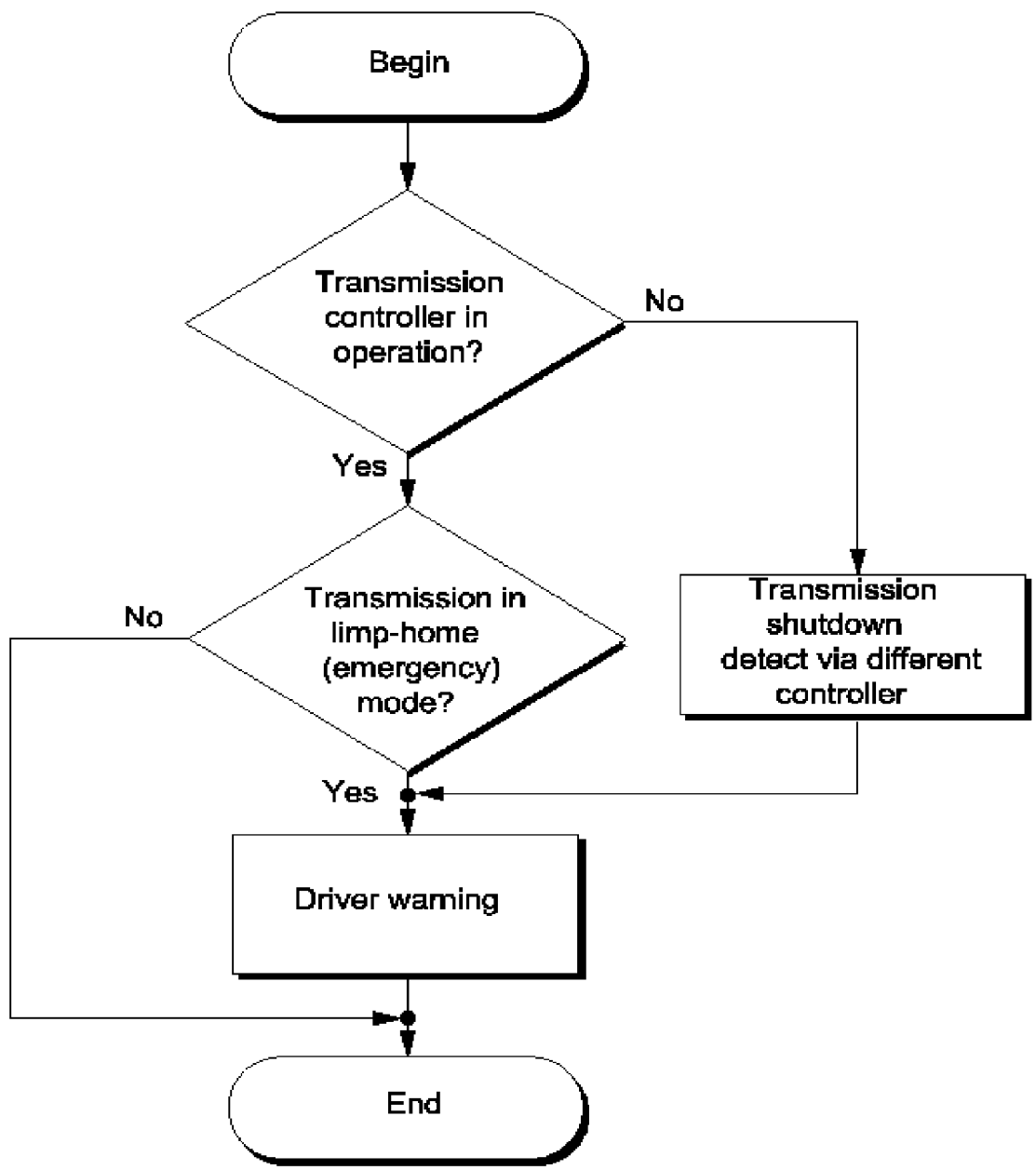
FIG. 2 shows a flow diagram to detect an emergency (limp-home) operation of the transmission controller within the context of the method of the invention.

Also depicted in FIG. 2 is a flow diagram that describes a detection of a limp-home operation of the transmission controller within the context of the method of the invention. In the event of a possible failure of the transmission controller, a check is made of whether the transmission control device is in operation. When the transmission control device is switched on, a check is made of whether a limp-home operation is active. Finally, if a limp-home operation is active, a driver warning is output. If no limp-home operation is active in the transmission controller, the method of the invention may be terminated immediately.

If the transmission controller is switched off, a check may be made with another control device of whether the transmission controller is shut down and a so-called transmission shutdown has been carried out. When the transmission controller is shut down, a driver warning is output.

What is claimed is:

1. A method for at least one of controlling and adjusting a drive train of a vehicle having an engine and a transmission in which the transmission is controlled via a transmission controller and the engine is controlled via an engine controller, comprising detecting an emergency signal relative to improper operation of a clutch, the transmission or transmission controller and detecting for an indication of a desire to stop on the part of a driver and activating a stall assistance as a function of the emergency signal and detection of an indication of a desire to stop on the part of the driver.

2. The method of claim 1, wherein the transmission is an automatic transmission.

3. The method as described in claim 2, wherein a check is made of whether the transmission controller has failed and, if it has failed, a check is made of whether there is an indication of a desire to stop on the part of the driver, and the engine controller activates the stall assistance when there is such an indication.

4. The method as described in claim 1, wherein, when there is a failure of at least one of the clutch and transmission actuation, at least one emergency signal is transmitted to the engine controller.

5. The method as described in claim 2, wherein, when there is a failure of at least one of the clutch and transmission actuation, at least one emergency signal is transmitted to the engine controller.

6. The method as described in claim 3, wherein the indication of a desire to stop on the part of the driver is detected by the engine controller by sensing at least one of whether the accelerator pedal is not actuated, whether the brake is actuated, or whether the engine speed drops below a threshold value.

7. The method as described in claim 6, wherein idle speed is used as a threshold value.

8. The method as described in claim 1, wherein, in the event of a failure of the transmission controller, a check is made of whether the transmission controller is in operation and, when the transmission controller is switched on, a check is made of whether a limp-home mode is active and, if a limp-home mode is active, a driver warning is output.

9. The method as described in claim 2, wherein, in the event of a failure of the transmission controller, a check is made of whether the transmission controller is in operation and, when the transmission controller is switched on, a check is made of whether a limp-home mode is active and, if a limp-home mode is active, a driver warning is output.

10. The method as described in claim 1, wherein, when the transmission controller is switched off, a check is made using another control device of whether the transmission controller has been shut down and, if so, a driver warning is output.

11. The method as described in claim 8, wherein an appropriate signal is sent to a driver information device as a driver warning.

12. The method as described in claim 9, wherein an appropriate signal is sent to a driver information device as a driver warning.

13. The method as described in claim 1, wherein at least one of a fuel supply or an ignition is immediately switched off by the engine controller when the stall assistance is active.

14. The method as described in claim 1, wherein an idle controller is switched off by the engine controller when the stall assistance is active.

15. The method as described in claim 14, wherein at least one of a throttle angle or the fuel supply are limited by the engine controller when the stall assistance is active in order to limit the idle controller.

16. A drive train for a vehicle having an engine and a transmission, a transmission controller being provided to control the transmission and an engine controller being provided to control the engine, wherein a stall assistance may be activated as a function of an emergency signal and an indication of a desire to stop on the part of the driver.

17. The drive train as described in claim 16, wherein a detector for an indication of a desire to stop on the part of a driver is provided such that when there is a failure of the transmission controller and an indication of a desire to stop on the part of the driver is detected, the engine is shut down by the engine controller.

* * * * *